United States Patent
Davis

[15] 3,690,131
[45] Sept. 12, 1972

[54] AUTOMOBILE LOCKING DEVICE

[72] Inventor: Gordon E. Davis, P.O. Box 1128, 9823 San Antonio St., Apt. E, South Gate, Calif. 90280

[22] Filed: Aug. 17, 1970

[21] Appl. No.: 64,172

[52] U.S. Cl. ....................70/203, 70/212, 70/238
[51] Int. Cl. ....................B60r 25/02, E05b 65/12
[58] Field of Search........90/202, 203, 211, 212, 238, 90/199, 200; 24/230.5, 73 HH, 201 A; 294/19, 24, 26, 92

[56] References Cited

UNITED STATES PATENTS

| | | | |
|---|---|---|---|
| 3,245,239 | 4/1966 | Zaidener | 70/202 |
| 2,152,565 | 3/1939 | Peterson | 70/212 |
| 3,104,434 | 9/1963 | Noordhoek | 24/230.5 X |
| 1,193,679 | 8/1916 | Fox | 70/202 |
| 1,414,991 | 5/1922 | McKeage | 70/211 |
| 1,421,401 | 7/1922 | Byers | 70/212 |
| 3,190,090 | 6/1965 | Zaidener | 70/203 |
| 3,550,409 | 12/1970 | Pariser | 70/203 |

Primary Examiner—Albert G. Craig, Jr.
Attorney—Ronald L. Juniper

[57] ABSTRACT

A steering wheel locking device for an automobile which includes an adjustable telescoping center rod section having a V-shaped end adapted to hook tightly around a steering wheel rim and connected spoke. The other end of the device has a U-shape adapted to securely engage a brake pedal so as to rigidly lock the steering wheel in place.

7 Claims, 4 Drawing Figures

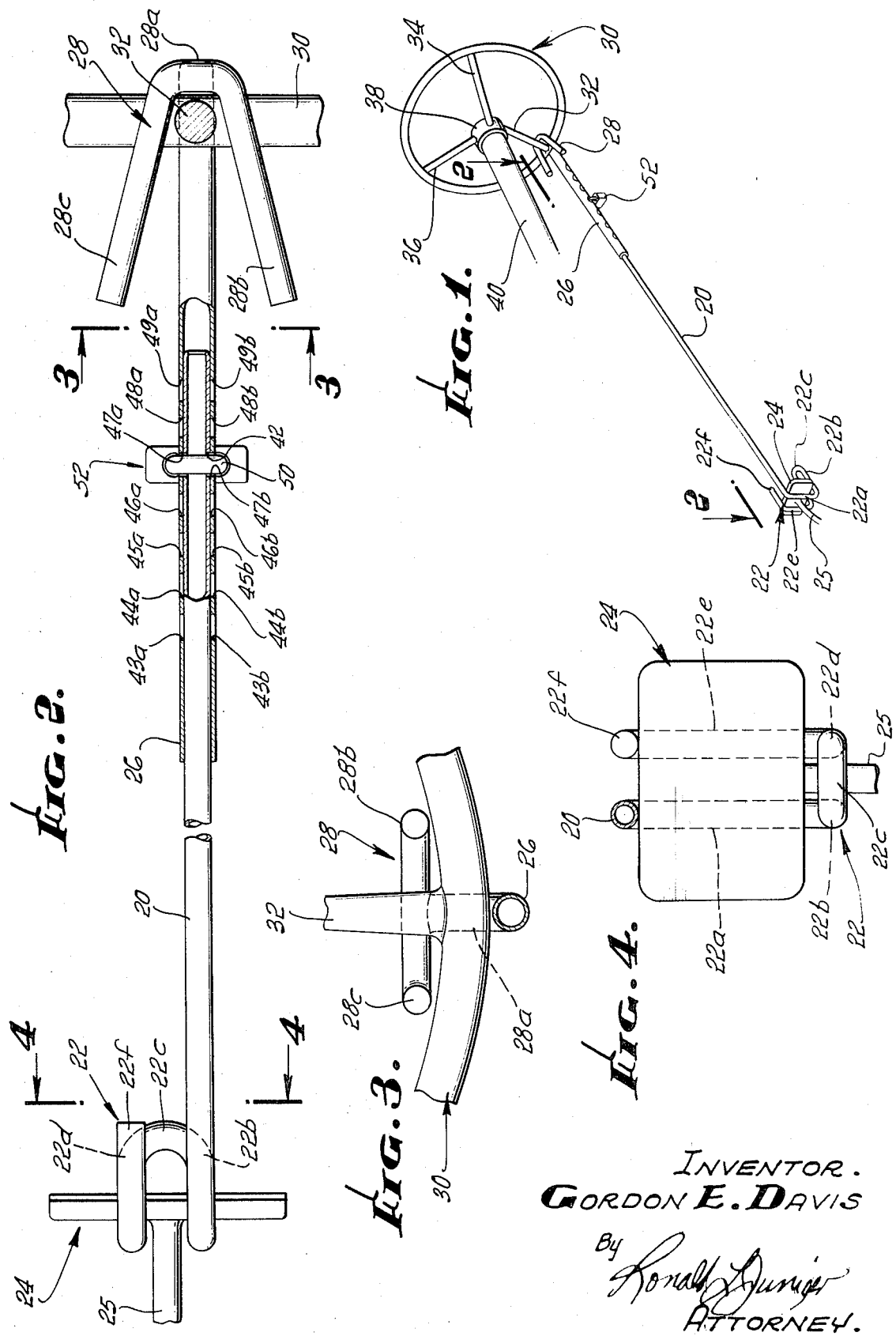

AUTOMOBILE LOCKING DEVICE

BACKGROUND OF THE INVENTION

With the continuing increase of crime these days, and particularly automobile thefts, a need has developed for automobile anti-theft devices which are effective and inexpensive. Many of the multitude of devices developed do not meet both of these criteria. Some may be inexpensive but they are seldom truly effective. On the other hand, those that are most effective are often too expensive to be practical.

Accordingly, it is the primary object of this invention to provide an effective automobile locking device which is adjustable, inexpensive and practical, thereby, overcoming the defects in the locking devices prior to this invention.

BRIEF DESCRIPTION OF THE DRAWINGS

FIG. 1 is a perspective view of the locking device engaging and locking a steering wheel and brake of an automobile together.

FIG. 2 is a plan view of the lock device, partly fragmented, as shown in FIG. 1.

FIG. 3 is a sectional view of the V-shaped hooking portion of the device taken through 3—3 in FIG. 2.

FIG. 4 is a sectional view of the U-shaped hooking portion of the device taken through 4—4 in FIG. 2.

DETAILED DESCRIPTION OF THE INVENTION

Referring to the drawings, the perspective view of the device in FIG. 1 shows it locked as it would be used in an automobile. As shown, the device includes a straight inside rod 20 terminating in a U-shaped hook 22 adapted to conform to and tightly engage a brake pedal 24, which normally is a flat, generally rectangularly shaped, plate supported by a lever 25 attached to its base which, through suitable linkage, actuates the brakes.

The hollow outside rod 26 has an interior, longitudinally extending, constant shape (generally circular) conforming with the constant exterior shape of rod 20, but slightly larger in size so that rod 20 can slide into rod 26 to provide a longitudinally adjustable telescoping extension of the rods. On the free end of rod 26 a V-shaped hook 28 is used to engage both a circular steering wheel rim 30 and an associated adjacent spoke 32 of a steering wheel which includes other spokes 34 and 36 all of which radially engage the steering wheel rim 30 and a central hub 38 on the end of a steering column 40.

The inner rod 20, near the end to be slid into rod 26 has a hole 42 which passes diametrically through it and which is intended to be matingly aligned with one of a series of holes 43a and 43b, 44a and 44b, 45a and 45b, 46a and 46b, 47a and 47b, 48a and 48b and 49a and 49b, each of which are formed in the diametrically opposite sides of outside hollow rod 28. Thus, when inner rod 20 is slid into outer rod 26 the hole 42 is set in alignment as desired with one of the holes in outer rod 26, the movable curved bar shackle 50 of a padlock 52 is passed through the mated holes and is locked in place so as to secure the locking device. When the rods are locked together in order to secure the respectively engaged steering wheel and brake pedal in a substantially immobile position the rods are telescoped inwardly so that the opposite hook ends tightly engage, respectively, the steering wheel and brake pedal.

The particular form of the device shown provides the special improvements in this automobile locking device. Thus, the V-shaped hook 28 includes a portion formed as a curved neck 28a that is just long enough to space the straight rod 26 from the portions of the V-shaped hook which form the diverging arms 28b and 28c about the same distance as the diameter of the adjacent engaged portion of the steering wheel rim 30. A tight engaged fit is thereby provided on the steering wheel rim 30.

Accordingly, the divergence of arms 28b and 28c from their common base near the juncture of neck 28a is angled outwardly gradually to snugly engage the exterior surface of the spoke of a steering wheel, such as 32. Moreover, because of this gradual divergence of the V-shaped hook 28, varying sizes of steering wheel spokes can be securely and rigidly engaged as the outwardly diverging arms 28b and 28c are pressed against them.

In order to facilitate the closest fit feasible for this device, the form of hook 28 as embodied in the drawings, and particularly as shown in FIG. 3, preferably is provided with a curved neck 28a having an interior curved shape which substantially conforms with the exterior curved shape of the steering wheel rim 30. Also, the curvature of neck 28a is such that the common plane of the axes of arms 28b and 28c, which are straight in this example, is generally parallel with the straight central axis of hollow rod 26. The free ends of arms 28b and 28c are pointed generally toward the U-shaped hook 22 on the opposite end of inside rod 20 which is telescopically engaged with outside rod 26.

In turn, the U-shaped hook 22 (when the rod 20 of which it is a part, is engaged telescopically with rod 26) is formed by a first portion as a perpendicular bend of rod 20 (in the opposite direction from which neck 28a takes) that forms a first leg 22a which extends the width of brake pedal 24, then takes a perpendicular bend generally toward the engaged V-shaped hook 28 of rod 26 to extend a short distance as an arm 22b. Then, in the form shown, arm 22b curves in a 180° loop 22c and turns to begin a second portion substantially the same as the first portion. This second portion includes an arm 22d (which is generally the length of arm 22c and parallel thereto) which then takes another perpendicular turn back toward the juncture of the straight portion of rod 20 to form a second leg 22e which is about the same length as first leg 22a, parallel thereto and constantly spaced therefrom. The second leg 22e extends to another perpendicular portion curved toward the V-shaped hook 28 which terminates the U-shaped hook 22 as a short, straight end 22f parallel with but spaced from the adjacent portion of rod 20. Hence, as shown, there are formed two matching U-shaped portions of the hook which are secured in use to brake pedal 24 on the opposite sides of attached supporting lever 25 and spaced constantly apart by the connecting element loop 22c which holds the two portions in a rigid spatial relationship.

Though a particular form of this invention has been described in detail, it is intended that various modifications are included to the extent that they are encompassed within the spirit of the following appended claims. I claim:

1. A locking device for automobiles comprising: a straight inner rod; a straight hollow outer rod adapted to slidably receive said inner rod within said hollow outer rod for telescoping extension of said rods relative to each other; locking means for selectively securing said rods rigidly together when in said telescoping relationship to each other; an open V-shaped hook on the free end of said outer rod adapted to tightly engage both a steering wheel rim and an associated adjacent spoke of said steering wheel, said V-shaped hook formed with a curved neck connecting it to said rod and a pair of arms diverging from a common base near the juncture of said neck, wherein said curved neck is adapted to tightly engage the exterior of a steering wheel rim and the diverging arms tightly engage an adjacent associated spoke attached to said steering wheel rim; an open double U-shaped hook on the free end of said inner rod which includes a first portion formed as a perpendicular bend of said rod to provide a first leg which extends the width of the brake pedal on which it is to be secured, then takes another perpendicular bend to point toward the V-shaped hook on the opposite end of the telescopically engaged outer rod then curves to form a second portion which includes an arm which takes a perpendicular bend toward the straight hollow rod to form a second leg about the same length as said first leg, parallel thereto and constantly spaced therefrom, said second leg extending perpendicularly toward said V-shaped hook as a short straight end parallel with, but spaced from the adjacent portion of said rod whereby when said rods are telescoped together, the hooks on their respective ends tightly engage a steering wheel and spoke on one end and a brake pedal on the other so that they are substantially immobile when the rods are locked together in a preselected rigid position.

2. A locking device for automobiles comprising: an inner rod; a hollow outer rod adapted to slidably receive said inner rod within said hollow outer rod for telescoping extension of said rods relative to each other; locking means for selectively securing said rods together when in telescoping relationship to each other; one of said rods having an open V-shaped hook end adapted to tightly engage both a steering wheel rim and an associated adjacent spoke of said steering wheel; and the other of said rods having an open U-shaped hook end adapted to tightly engage a brake pedal so that said rods can be telescoped inwardly and locked in a rigid position which secures an engaged steering wheel and brake pedal in a substantially immobile position, wherein the open engaging portions of both the V-shaped hook end and the U-shaped hook end extend substantially parallel with the axis of said rods to allow quick opening and tight engagement when locked, the V-shaped hook end includes a portion formed as a curved neck and the V-shaped portion of said hook end includes a pair of arms diverging from a common base near the juncture of said neck with said rod.

3. A locking device for automobiles as defined in claim 2, wherein the angle at which the arms of said V-shaped portion diverge is sufficiently gradual to snugly engage the exterior opposite sides of the spoke of a steering wheel.

4. A locking device for automobiles as defined in claim 2, wherein the curved neck portion thereof is just long enough to space the straight rod to which it is joined from the diverging arms which it connects approximately the same distance as the diameter of the adjacent engaged steering wheel rim.

5. A locking device for automobiles as defined in claim 4, wherein said curved neck has an interior curved shape which substantially conforms with the exterior curved shape of the engaged shape of the steering wheel rim.

6. A locking device for automobiles, as defined in claim 2 wherein the U-shaped hook end of said rod includes a first portion formed by a perpendicular bend of said rod to provide a leg which extends the width of the brake pedal on which it is to be secured, then takes another perpendicular bend toward the V-shaped hook end of the telescopically engaged other rod.

7. A locking device for automobiles, as defined in claim 6 which includes a second portion substantially the same in structure as said first portion, with comparable parts parallel, but constantly spaced from said first portion just enough to allow engagement of said first and second portions on opposite sides of a supporting lever attached to a brake pedal to which the U-shaped hook is to be engaged and wherein said first and second portions thereof are rigidly joined together by a connecting element to maintain the spatial relationship between them.

* * * * *